Oct. 21, 1969    H. J. DE SMET    3,474,207
DAMPING SPRING FOR SELECT BARS IN CROSSBAR SWITCHES
Filed Jan. 22, 1968    3 Sheets-Sheet 1

INVENTOR
HERMAN J. DE SMET
BY *Curphey & Erickson*
PATENT AGENTS

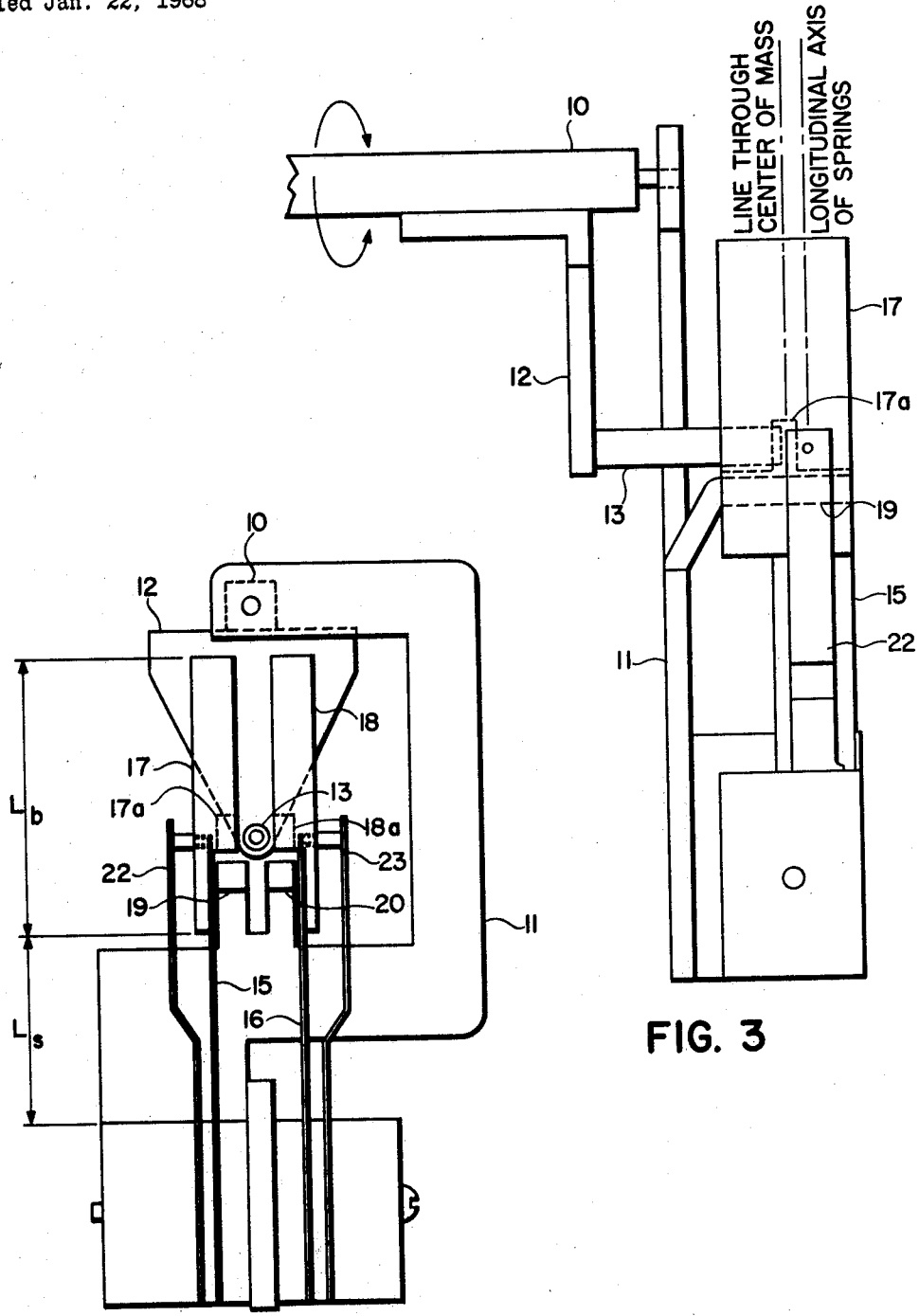

INVENTOR
HERMAN J. DE SMET
BY *Curphey & Erickson*
PATENT AGENTS

United States Patent Office 3,474,207
Patented Oct. 21, 1969

3,474,207
DAMPING SPRING FOR SELECT BARS IN CROSSBAR SWITCHES
Herman J. de Smet, Ottawa, Ontario, Canada, assignor to Northern Electric Company Limited, Montreal, Quebec, Canada
Filed Jan. 22, 1968, Ser. No. 699,699
Int. Cl. H01h 63/36
U.S. Cl. 200—175        9 Claims

ABSTRACT OF THE DISCLOSURE

A damping and restoring spring assembly used in a crossbar switch for restoring a select bar to its neutral position. The spring assembly comprises a pair of cantilevered springs mounted on opposite sides of a restoring arm on the select bar. Each of the springs has a relatively massive damping weight affixed to the free ends thereof so that the mass centre of the weights is offset from the respective longitudinal axes of the springs in a direction orthogonal to the plane of displacement of the springs. The restoring arm is positioned to contact the weights at points which impart a torsional rotation to the springs so as to excite a torsional oscillation therein.

---

This invention relates to an improved damping and restoring spring used in a crossbar switch for restoring a select bar to its neutral position, and more particularly to means for exciting a plurality of vibratory modes in the spring in order to rapidly dissipate the energy therein and thereby dampen the oscillations of the select bar in an efficient manner.

In the operation of a crossbar switch, a select bar having a plurality of select fingers, is rotated about its longitudinal axis in either of two directions, upon energization of one of a pair of electromagnets. The select fingers, in turn, pre-set the crossbar switch so that upon actuation of a hold magnet associated with a particular select finger, a set of contacts will be actuated in order to complete a circuit through the switch. Upon release of the energized electromagnet, the select bar is returned to its neutral position by one or more restoring springs associated therewith.

One common arrangement utilizes a pair of cantilevered springs disposed to urge against opposite sides of a restoring arm on the select bar. However, the inertia imparted to the select bar during the initial restoring interval causes it to overshoot the neutral position thus resulting in a series of damped oscillations. If this overshoot is sufficient, actuation of a second hold magnet at the wrong instant could result in erroneous operation of another set of contacts.

In an attempt to arrest this vibratory action, a damping weight has been affixed to the free end of each of the springs. The restoring arm is disposed to contact each of the weights at about their mass centre. Because of the inertia required to deflect the weights, the overshoot is reduced. However, in order to be effective, the mass of the weights must be relatively large in comparison to the effective mass of the select bar and its associated fingers. Since the inertia of one of the weights must be overcome during the initial deflection of the select bar, a relatively large electromagnetic force is required for rapid operation of the switch. Additionally, in order to obtain rapid return of the select bar, the tension of the cantilevered springs must also be increased, thereby decreasing the damping efficiency. With prior systems this results in a trade-off between operating time of the crossbar switch, size of the components used and reliability of operation. Thus, the above-described restoring and damping springs are unsatisfactory for a modern crossbar system which requires rapid operation of the crossbar switch, together with reduced size and high reliability.

In order to reduce the size of the electromagnets in the switch, a significant reduction in the mass of the damping weights must also be made together with a reduction in the stiffness of the cantilevered springs without diminishing the speed of operation or the reliability.

It has been discovered that such a significant reduction in the mass of the damping weights can be achieved while retaining the overall damping efficiency, by offsetting the center of mass of each of the weights from the respective longitudinal axes of cantilevered springs in a direction orthogonal to the plane of displacement of the springs. In addition, the restoring arm on the select bar is positioned to contact each of the weights at a point offset from the aforementioned longitudinal axes so as to impart a torsional rotation to each of the springs during contact therebetween. Thus, when one or the other of the cantilevered springs is deflected to the operated position of the select bar by the restoring arm, the weight is displaced due to the primary deflection of the cantilevered springs and twisted due to the torsional couple imparted thereto.

Upon release of the select bar, the displaced cantilevered spring urges the restoring arm towards the neutral position. Due to the torsional rotation in the spring, a torsional frequency mode is excited wherein the damping weight commences to oscillate about the longitudinal axis of the cantilevered spring. This torsional frequency is relatively high compared to the primary frequency mode which is also excited and is due to simple deflection of the cantilevered spring. The inertia imparted to the select bar during its initial return causes it to overshoot the neutral position and strike the other damping weight, resulting in both simple deflection of the free end of the cantilevered spring as well as a torsional rotation thus exciting both primary and torsional oscillations in it.

Since the speed and efficiency in which the system is brought to a stop is determined by frictional losses in the material, air damping and impact between the select arm and the damping weights, the excitation of the high frequency torsional oscillations significantly reduces the time interval required to restore the select bar to its neutral position and improve the damping efficiency. This improved efficiency allows significantly smaller damping weights to be used which in turn reduces the size of the actuating magnets thereby reducing the overall size and cost of the crossbar switch.

An example embodiment of the invention will now be described with reference to the accompanying drawings in which:

FIGURE 2 is a front elevational view of the switch illustrated in FIGURE 1 with the select bar shown in an inoperative position;

FIGURE 3 is a side elevational view of the crossbar switch illustrated in FIGURE 1;

Figure 1:
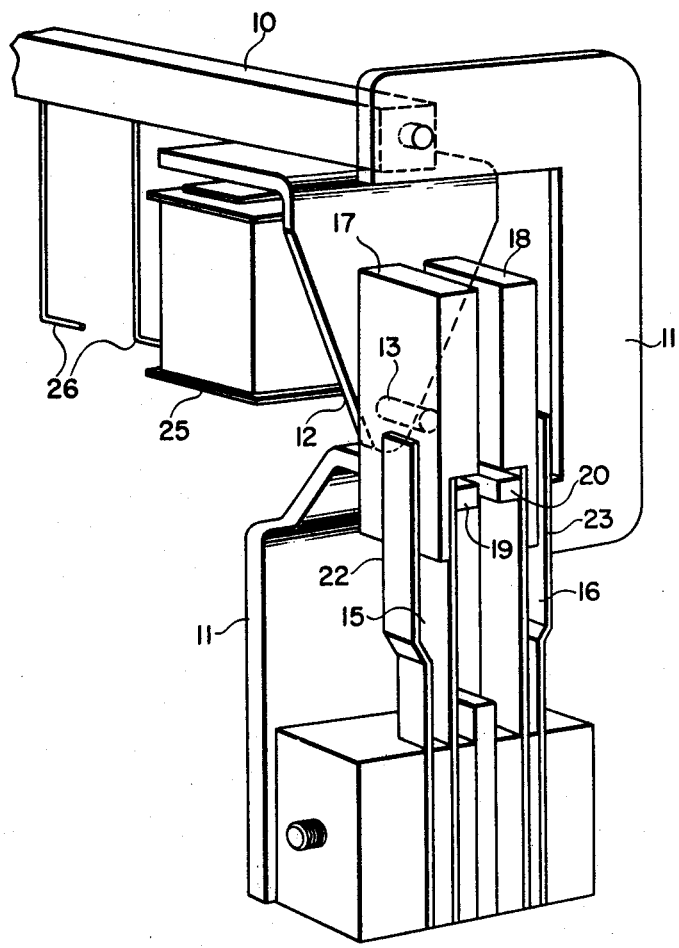
FIGURE 1 is a fragmentary perspective view of a crossbar switch illustrating an improved damping means for a select bar in accordance with the present invention.

Referring to FIGURES 1–5, there is illustrated a select bar 10 rotatably mounted along its longitudinal axis on a frame 11 of the crossbar switch. Affixed to the select bar 10 is a restoring arm 12, which also functions as an armature. The arm 12 has an actuating pin 13 displaced orthogonally from the longitudinal axis of the select bar 10. As shown, the pin 13 has a hard rubber sleeve to effect good damping and reduce noise. A pair of cantilevered leaf springs 15 and 16 are mounted on the frame 11 on opposite sides of the actuating pin 13. Each of the cantilevered springs 15 and 16 has a relatively massive rigid damping weight in the form of elongated bars 17 and 18 respectively affixed to the free ends thereof. In the inoperative or neutral position, the elongated bars 17 and 18 are tensioned against a stop means comprising a pair of studs 19 and 20 respectively which form part of the frame 11. A pair of tensioning leaf springs 22 and 23 mounted on the frame 11, are disposed to bear against the elongated bars 17 and 18 respectively.

As shown in FIGURE 3, the mass center of the elongated bars 17 and 18 is displaced from the longitudinal axes of the cantilevered springs 15 and 16. In addition, the actuating pin 13 is positioned to contact each of the elongated bars 17 and 18 at a point displaced from the longitudinal axis of the springs 17 and 18. To accurately control the point at which the actuating pin 13 contacts the bars 17 and 18, slots 17a and 18a are provided in each of the springs 17 and 18 respectively so that the free end of the pin 13 bears against the bars 17 and 18 at predetermined points.

Figure 4:
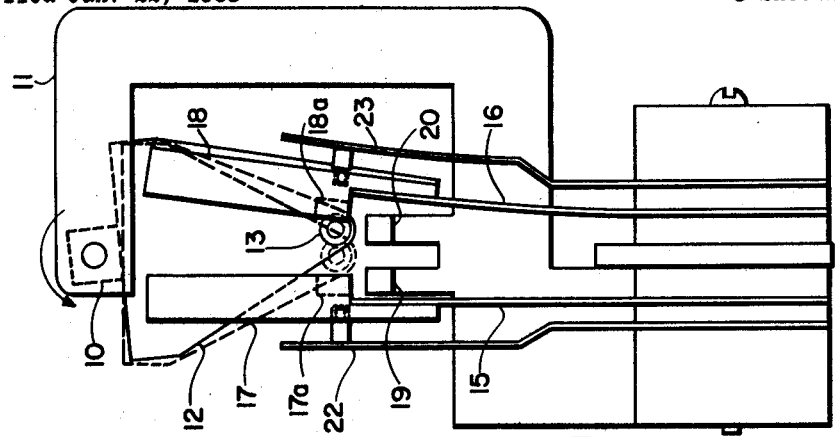
FIGURE 4 is a front elevational view of the switch illustrated in FIGURE 1 with the select bar shown in an operated position.
Figure 5:
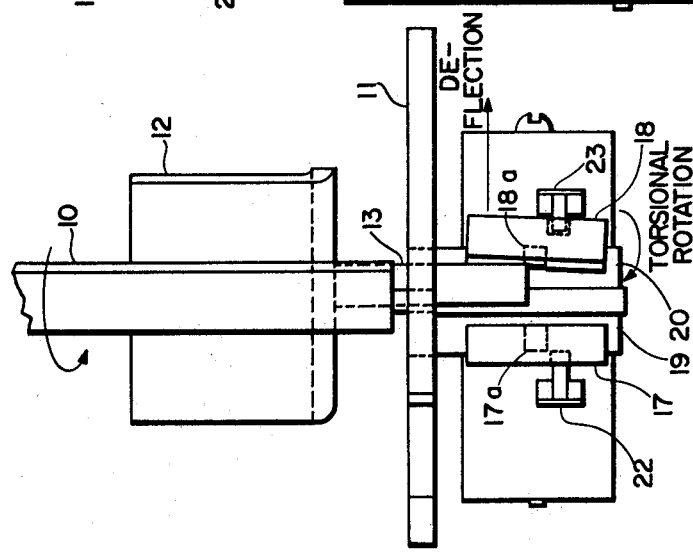
FIGURE 5 is a top plan view of the crossbar switch illustrated in FIGURE 1 showing the select bar in an operated position.

Referring to FIGURES 1-5, in operation, energization of a select bar magnet 25 attracts the armature portion of the restoring arm 12 which causes the select bar 10 to rotate counter-clockwise from its inoperative position (FIGURE 2) to an operated position (FIGURES 4 and 5). This action carries with it a plurality of select fingers in a well known manner, two of which are shown as 26 in FIGURE 1. Rotation of the select bar 10 to the operated position causes the actuating pin 13 to bear against the elongated bar 18 and deflect both the cantilevered spring 16 and the tensioning spring 23 about their fixed ends (FIGURE 4). In addition, because the actuating pin 13 contacts the elongated bar 18 at a point displaced from the longitudinal axis of the cantilevered spring 16, a torsional rotation is imparted to the spring 16 which causes the elongated bar 18 to rotate slightly as shown in FIGURE 5.

Figure 6:
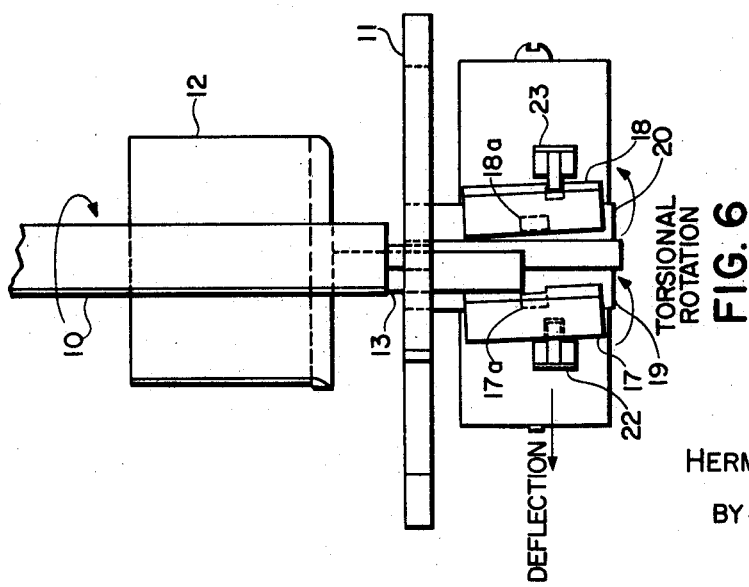
FIGURE 6 is a top plan view of the crossbar switch illustrated in FIGURE 1 showing the select bar in a transient state during return to its inoperative position.

Upon release of the select bar magnet 25, the pretensioned springs 16 and 23, urging against the actuating pin 13, commence to return the select bar 10 to its neutral position. As the actuating pin 13 reaches the neutral or inoperative position, the forward edge of the elongated bar 18 (as shown in FIGURES 4 and 5) strikes the stud 20 causing the former to rotate in a counter-clockwise direction as shown in FIGURE 6, thus exciting the torsional oscillatory mode in the cantilevered spring 16. Concurrently, the inertia of the bar 18 upon striking the stud 20 causes it to rebound, thereby exciting the primary or low frequency mode in the cantilevered spring 16 such that the bar 18 rotates about a point on its prolonged axis.

Due to the inertia of the select bar 10 and the restoring arm 12, the actuating pin 13 follows through beyond the neutral position and strikes the elongated bar 17. This impact causes a torsional rotation in the cantilevered spring 15 and an overall deflection of the spring 15 and the bar 17 (FIGURE 6). Hence, both the primary and the torsional modes are excited in the cantilevered springs 15 and 16 by each impact between them and either the actuating pin 13 or the studs 19 or 20.

It has been found that the most effective damping occurs when the axes of the tensioning springs 22 and 23 are in line with those of the cantilevered springs 15 and 16 as shown in FIGURE 3. As a result, the point of contact of the actuating pin 13 is displaced from a plane through both axes.

As illustrated in FIGURE 2, when the select bar 10 is in its neutral position, the bars 17 and 18 are tensioned against the studs 19 and 20 respectively, and the actuating pin 13 is spaced from the bars 17 and 18. This prevents a transfer of kinetic energy from the elongated bar 18, through the actuating pin 13 to the elongated bar 17 during the initial return of the select bar 10 and thereafter during subsequent impacts.

In addition, by utilizing two separate studs 19 and 20 for the stop means rather than a single stud, a significant reduction in the transfer of kinetic energy from the elongated bar 18 through the stop means to the elongated bar 17 is achieved. In order to accommodate the two studs 19 and 20 in the limited space available, it was necessary to modify the uniform dimensions of the bars as shown in FIGURE 2.

As a result, the bars 17 and 18 do not make contact directly with the studs 19 and 20, but make contact through the upper ends of the springs 15 and 16. However, because the springs 15 and 16 are rigidly affixed to the bars 17 and 18 in this area, effective contact between the bars 17 and 18 and the studs 19 and 20 is effected.

In the illustrated embodiment, each of the springs 15, 16, 22 and 23 is a single leaf spring. The use of tensioning springs 22 and 23 is not absolutely necessary to the invention. However, they provide a ready means for controlling the amount of pressure which the elongated bars 17 and 18 exert on the studs 19 and 20 when the select bar 10 is in its neutral position. This, in turn, controls the velocity with which the bars 17 and 18 strike the studs 19 and 20, and the momentum imparted to the select bar 10 once the select bar magnet 25 is released.

As shown in FIGURE 2, the length $L_b$ of the elongated bars 17 and 18 is greater than the free length $L_s$ of the springs 15 and 16. Also, the elongated bars 17 and 18 are disposed to strike both the pin 13 and the studs 19 and 20 as close to the bottom thereof as possible. This assists in increasing the torsional rotation as hereinbefore explained.

The above describes the initial motion of the select bar 10, together with its restoring arm 12, the cantilevered springs 15 and 16 and the elongated bars 17 and 18 after the release of the select bar magnet 25. After one or more impacts between the elongated bar 17 and the actuating pin 13, the select bar 10 is urged by it, in conjunction with the springs 17 and 22, to move towards the right where its motion is again impeded by impact with the elongated bar 18. After a series of impacts between the two bars 17 and 18 and the actuating pin 13, the select bar 10 is brought to rest in its neutral position.

Each impact between the actuating pin 13 and the elongated bars 17 or 18 transfers energy. Some of the energy so transferred is diverted to the primary and torsional modes where it is ultimately dissipated by internal friction and air damping. Also, energy is transfered between the elongated bars 17 and 18 and the studs 19 and 20. In addition, some frictional losses occur between the point at which the tensioning springs 22 and 23 contact the elongated bars 17 and 18. As a result of positioning the actuating pin 13 so that the torsional mode as well as the primary mode is excited in the cantilevered springs 15 and 16 during impact and displacement, the mass of the bars 17 or 18 can be substantially reduced without impairing the reliability of the damping means. With such an improved system the excursions of the select bar 10 after the initial overshoot can be made of negligible amplitude. As a result of utilizing the improved damping means, smaller select bar magnets and tensioning springs can be used thereby further decreasing the overall size, weight and cost of the crossbar switch.

What is claimed is:
1. In a crossbar switch comprising:
 (a) a frame;
 (b) a select bar rotatably mounted on said frame, said select bar being rotatable about an axis in either direction from a neutral position;

(c) the select bar including a restoring arm having an orthogonal component relative to said axis;

(d) a pair of cantilevered springs affixed to said frame and positioned on opposite sides of the restoring arm; one or the other of said cantilevered springs being disposed to coact with the restoring arm so as to urge the select bar towards said neutral position, when the select bar is rotated in one or the other of said directions respectively;

(e) stop means affixed to the frame and positioned between the cantilevered springs, each of the cantilevered springs being contiguous with said stop means when the select bar is in the neutral position;

(f) the improvement comprising:

each of the cantilevered springs having a relatively massive rigid weight at the free end thereof; the centre of a mass of each of said weights being offset from the respective longitudinal axes of the cantilevered springs in a direction orthogonal to the plane of displacement of said springs; and (g) the restoring arm contacting each of said weights at a point offset from said longitudinal axes so as to impart a torsional rotation to each of said springs during contact therebetween.

2. A crossbar switch as defined in claim 1 in which the stop means and the restoring arm contact each of the elongated bars adjacent the ends thereof nearest the fixed ends of said springs.

3. A crossbar switch as defined in claim 2 in which each of the cantilevered springs has a tensioning spring in juxtaposition therewith, said tensioning springs being adapted to urge each of the respective cantilevered springs against the restoring arm at a point on said longitudinal axes.

4. A crossbar switch as defined in claim 3 in which the select bar rotates about the longitudinal axis thereof.

5. A crossbar switch as defined in claim 4 in which each of the cantilevered springs and the tensioning springs is a leaf spring.

6. A crossbar switch as defined in claim 5 in which said stop means comprises: a pair of studs, each of said studs being disposed to contact only one of said cantilevered springs.

7. A crossbar switch as defined in claim 6 in which each of said cantilevered springs is tensioned against the respective stud and the restoring arm is spaced from said weights when the select bar is in the neutral position.

8. A crossbar switch as defined in claim 1 in which said stop means comprises:

a pair of studs, each of said studs being disposed to contact only one of said centilevered springs.

9. A crossbar switch as defined in claim 8 in which each of said cantilevered springs is tensioned against the respective stud and the restoring arm is spaced from said weights when the select bar is in the neutral position.

References Cited

UNITED STATES PATENTS

| 2,013,513 | 9/1935 | Dressel. | |
| 2,290,725 | 7/1942 | Bartels et al. | |
| 2,827,518 | 3/1958 | Burwell | 200—177 |
| 3,364,447 | 1/1968 | Peek | 335—112 |
| 3,366,901 | 1/1968 | Keller | 335—112 |

FOREIGN PATENTS 897,130 10/1953 Germany.

ROBERT K. SCHAEFER, Primary Examiner

ROBERT A. VANDERHYE, Assistant Examiner

U.S. Cl. X.R.

200—166; 335—112